3,773,866
Patented Nov. 20, 1973

3,773,866
PREPARATION OF ESTERS OF PHOSPHORUS ACIDS
Joseph W. Baker and Ignatius Schumacher, St. Louis, Mo., assignors to Monsanto Company, St. Louis, Mo.
No Drawing. Filed June 24, 1971, Ser. No. 156,563
Int. Cl. C07f 9/08, 9/16
U.S. Cl. 260—973          17 Claims

ABSTRACT OF THE DISCLOSURE

Halogen-containing esters of phosphorus acids are prepared by an improved process, whereby thiol- or hydroxyl-containing organic materials and phosphorus halides are reacted at specified temperatures in the presence of ammonium salts of inorganic and organic acids thereby providing high yields of substantially pure esters and allowing preparation of selected halogen-containing mono- and di-esters of phosphorus acids having substantially no side reactant contamination. The phosphorus esters are useful as intermediates in the preparation of plasticizers, oil additives and functional fluids.

BACKGROUND OF THE INVENTION

This invention relates to a novel process for the preparation of halogen-containing organophosphorus acid esters. More particularly, this invention is concerned with a process comprising an ammonium salt catalyzed reaction of halides of phosphorus and thiol- or hydroxyl-containing organic materials.

Numerous methods have been long known for preparing triorganophosphorus esters. One of those methods involves the reaction of a phosphoryl halide and a monohydric organic compound without the use of a catalyst. Such a process is not commercially practical because of the need for lengthy reaction times and the resultant low yields. Another disadvantage of processes of that type is the need for the use of excessive amounts of the monohydric organic compound.

Another known method comprises the addition of certain amines to the aforedescribed reaction mixture to effect higher yields. Thus, U.S. 1,785,951 discloses the use of certain aromatic amines, e.g., aniline and pyridine, as catalysts for preparing triaryl phosphates from phosphoryl chloride and a phenol at high temperatures. Similarly, U.S. 2,678,940 discloses the use of aromatic primary amines, e.g., aniline, and certain tertiary alkyl-amines, e.g., trimethylamine, as catalysts for preparing triaryl phosphates from phosphorus trichloride and a phenol. The cited processes, however, are concerned only with the preparation of triaryl phosphates and not with the selective preparation of halogen-containing mono- and di-esters of phosphorus acids.

In still other methods, the reaction is catalyzed, so as to produce greater yields, by adding a metal to the reaction mixture, such as copper powder, iron filings, calcium, aluminum or magnesium; or a halide such as aluminum chloride, vanadium chloride, magnesium chloride or boron trifluoride; or a sulfate such as copper sulfate; or an oxide such as magnesium oxide, vanadium oxide or copper oxide.

The employment of such catalyst has several attendant inherent disadvantages, among which are low conversion of the starting materials and lengthy reaction times required for completion of the reaction. As described in U.S. Pats. 2,610,978 and 2,632,018, an insoluble complex forms during the reaction when aluminum chloride is used as a catalyst.

When alcohols are reacted with a phosphoryl halide, either without a catalyst or in the presence of any of the abovementioned catalysts, other than magnesium chloride, undesirable by-products are formed. The by-products contribute difficult distillation problems, lower yields of the desired product and lower reaction efficiency. A method described in U.S. Pat. 2,410,118 is illustrative of the typical distillation problems encountered. In that method, distillation is difficult due to the high concentration of salts of various phosphorus acids in the distillation still.

U.S. Pat. 2,868,827 describes the use of titanium tetrachloride as a catalyst for producing organophosphate esters. Disadvantages encountered employing titanium tetrachloride reside in the excessive and lengthy times necessary to obtain desirable yields and the relatively large amounts of the metal halide catalysts required. Further, when the reaction is conducted in the presence of a titanium halide catalyst, recovery of the desired reaction product is a problem. At the completion of the reaction, it has been found necessary to wash the reaction mixture with a citrate or tartrate solution which forms a complex with the titanium catalyst. The complex is then removed by washing with water followed by drying the remaining product.

Another disadvantage encountered with the employment of many of the aforedescribed catalysts is the need for complicated material-handling procedures for the catalyst.

Additionaly, preparation of organophosphorus esters by the aforedescribed catalyzed reactions restricts the manufacturer in that only one specific type of organophosphorus ester of high purity could be prepared by the reaction. Thus, one could not prepare compounds of high purity such as, for example, cresyl phenyl phosphorochloridate, bromophenyl phenyl phosphorochloridate and the like. By the aforedescribed procedures, only relatively impure triorganophosphorus esters or esters containing the same aryl groups could be prepared, for example, triphenyl phosphate, tricresyl phosphate and the like. Thus, in the preparation of organophosphorus esters by the aforedescribed procedures, the specific organophosphorus esters prepared were contaminated by side reactants which could be only removed by lengthy and difficult washing and distillation procedures.

U.S. 2,046,031 discloses the addition of anhydrous ammonia upon completion of a phosphoryl chloride-alcohol reaction to prepare phosphorus triesters. The ammonia is added, however, as a hydrogen chloride scavenger, the ammonium chloride formed being separated from the esterification product. Since the ammonia is added subsequent to the esterification reaction, the ammonium chloride formed does not act as a catalyst.

U.S. 2,903,475 discloses reacting phosphonous dichlorides or phosphinous chlorides with alcohols in the presence of anhydrous ammonia which removes formed hydrogen chloride. The preparation of trivalent phosphonites and phosphinites does not necessitate use of a catalyst. Since the alkyl phosphonite or alkyl phosphinite cleaves in the presence of hydrogen chloride, a scavenger such as ammonia is required.

U.S. 2,903,477 discloses the preparation of esters of alcohols and carboxylic acids or anhydrides using sulfuric acid as catalyst. The reaction is carried out in the presence of ammonium ion, added in the form of ammonium salts, in order to inhibit discoloration of the product ester.

Similarly, U.S. 3,151,166 discloses the use of ammonium salts as color stabilizers in the preparation of ethanolamines from ethylene oxide and ammonia.

U.S. 3,155,710 discloses the preparation of phosphate esters, by reaction of phosphoryl halides and alcohols, in the presence of vanadium compounds, such as vanadium halides, ammonium vanadates and vanadium oxides, as catalysts. It has been found, however, that the use of compounds of transition metals of Groups IV–B and V–B of the Perodic Chart of the Elements (pp. 392–393, Handbook of Chemistry and Physics, 35th ed.) as catalysts for that reaction promotes discoloration of the product, contributes to prolonged reaction time and causes, in general, the same type of problems normally associated with such transition metal catalysts as titanium halides.

Accordingly, the objective of this invention is to provide a novel and improved process for the preparation of halogen-containing mono- and diorganophosphorus esters in which the disadvantages of the prior art are eliminated and selective esterification in high yields with substantially no by-product contamination is afforded.

SUMMARY OF THE INVENTION

The objective of this invention is accomplished by a novel process, combining a critical combination of catalyst and reaction temperature, for the preparation of halogen-containing organophosphorus acid esters wherein high yields of product are formed with substantially no side reactions and contaminants and whereby step-wise building of the ester is allowed in such a manner that mixed esters are prepared in an easy and economical manner. As an example of the innovative process of this invention, a compound such as chlorophenyl cresyl phosphorochloridate may be conveniently and inexpensively prepared, such preparation being difficult and expensive with known methods now available to the art. Further, mixtures of mono- and diorganophosphorus esters may be prepared in the same reaction vessel and separated by distillation precedures without undesirable disproportionation.

The unexpected and surprising aspect of the process of this invention is the fact that while the prior art (U.S. 3,155,710) discloses certain vanadium compounds, e.g., ammonium vanadate, as catalyst for the reaction of, for example, phosphoryl chloride and phenol to prepare triaryl phosphates, it has now been found that such vanadium compounds and compounds closely related thereto, e.g., the ammonium salts of transition metals of Group IV-B and Group V-B of the Periodic Chart of the elements, such as titanium, zirconium, hafnium, niobium and tantalum, are unsuitable as catalysts under the process conditions of the present invention. Thus, the ammonium salts of Group IV-B and Group V-B transition metal acids afford esterification products which are inordinately highly colored and the reaction is subject to the same problems encountered when using the transition metal halides, e.g., titanium tetrachloride, as catalysts.

The novel process of this invention comprises reaction, at specific temperatures, of halides of phosphorus of the formula $$Y_m-\overset{\overset{X}{\|}}{P}-Z_n$$

wherein X represents oxygen or sulfur; Y represents R or R'X wherein R represents alkyl, alkenyl, alkynyl, cycloalkyl, cycloalkenyl, cycloalkynyl, heterocyclyl or aryl; R' represents alkyl or aryl; $m$ represents 0 when $n$ is 3 and $m$ represents 1 when $n$ is 2; Z represents chloro or bromo; and $n$ represents 2 or 3, with a compound having the formula
(II)     R''XH
wherein R'' represents aryl and X represents oxygen or sulfur, in the presence of an ammonium salt of an acid.

The reaction sequence involved in the process of this invention proceeds through the following stages, exemplified by the reaction of phenol with phosphoryl chloride:

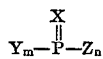

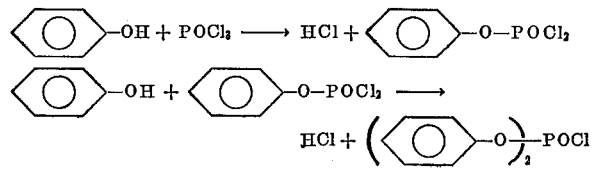

The phosphorus mono- and dihalidates produced are valuable intermediates in the preparation of plasticizers, oil additives and functional fluids and are prepared conveniently by the process of this invention and a high yield with substatnially no contamination by side reactions.

The catalysts used in the process of this invention may, in general, be any ammonium salt of an inorganic or organic acid which salt is characterized by the presence of a nitrogen atom capable of entering into a liquid complex with the phosphorus moiety of Formula I under the conditions of the present process. Essentially all ammonium salts capable of forming such complex are contemplated as catalysts in this process, with the exception of the ammonium salts of the Group IV-B and Group V-B transition metal acids, i.e., acids of titanium, zirconium, hafnium, vanadium, niobium and tantalum.

The catalyst concentration which is most effective in the process is a function of many variables, but is generally from about 0.001 to 2.0 mole percent based on the phosphorus halide. Preferably, from 0.01 to 0.1 mole percent is considered a practical level. Of course, greater or lesser amounts may be used effectively within the discretion and experience of those skilled in the art. Thus, the following list of ammonium salts is intended merely to illustrate the broad scope of the compounds which are useful as catalysts herein since it would be virtually impossible to specifically list each amonium salt intended.

Representative ammonium salts of acids which may be used as catalysts in the process of this invention include the following compounds, which are illustrative only and are not to be considered a limitation since, as defined above, any ammonium salt is suitable providing it is capable of complexing with the phosphorus moiety of Formula I without restriction on the number of carbon atoms in the salt molecule itself, if derived from an organic acid, and without restriction as to the substitutent groups which may be on either the carbon atoms or the nitrogen atoms of the salt compound. Further, there is virtually no limitation on the number of carbon atoms, or other atoms, in the ammonium salt molecule. Accordingly, the only limitation on the size or arrangement of the ammonium salt used is that of practicality and expense. The following list of illustrative compounds is therefore to be read in the light of the above teachings.

Ammonium salts of inorganic acids:
    ammonium sulfate
    ammonium chloride
    ammonium nitrate
    ammonium sulfite
    ammonium acid sulfate
    ammonium bromide
    ammonium carbonate
    ammonium fluoride
    ammonium nitrite
    ammonium phosphate
    ammonium phosphite
    ammonium silicate
    ammonium chromate
    ammonium molybdate
    ammonium tungstate
    ammonium manganate
    ammonium zincate
    ammonium stannate
    ammonium stannite
    ammonium arsenate
    ammonium antimonate
    ammonium bismuthate
    ammonium selenate
    ammonium chlorate
    ammonium hypochlorite
    ammonium hydrobromate
    ammonium perchlorate
    ammonium chlorite
    ammonium aluminum chloride
    ammonium arsenite ammonium pentaborate
ammonium bromoplatinate
ammonium bromostannate
ammonium bicarbonate
ammonium chloroiridite
ammonium chloroplumbate
ammonium cyanate
ammonium ethylsulfate
ammonium fluoborate
ammonium fluosilicate
ammonium fluosulfonate
ammonium permanganate
ammonium phosphomolybdate
ammonium thiocyanate Ammonium salts of organic acids:
ammonium formate
ammonium acetate
ammonium benzenesulfonate
ammonium chlorgallate
ammonium propionate
ammonium butyrate
ammonium valerate
ammonium caproate
ammonium caprate
ammonium laurate
ammonium myristate
ammonium palmitate
ammonium stearate
ammonium oxalate
ammonium malonate
ammonium succinate
ammonium adipate
ammonium sebacate
ammonium acrylate
ammonium citraconate
ammonium linoleate
ammonium fluoroacetate
ammonium chloroacetate
ammonium chlorobutyrate
ammonium lactate
ammonium crotonate
ammonium glyoxalate
ammonium acetoacetate
ammonium benzoate
ammonium toluate
ammonium phenylcarbonate
ammonium gallate
ammonium cinnamate
ammonium phthalate
ammonium sulfamate
ammonium trimethylacetate
ammonium 5-methyl octanoate
ammonium arachidate
ammonium tetracosanate
ammonium cyclopropanecarboxylate
ammonium cyclohexanecarboxylate
ammonium phenylacetate
ammonium toluate
ammonium tolylacetate
ammonium 4-phenylpentanoate
ammonium naphthoate
ammonium 2-phenylcyclohexanecarboxylate
ammonium acenaphthoate
ammonium biphenylacetate
ammonium diphenylacetate
ammonium phenanthroate
ammonium anthroate
ammonium 2-furancarboxylate
ammonium 2-thiophencarboxylate
ammonium thienylacetate
ammonium 3-pyridinecarboxylate
ammonium 2-thenylmalonate
ammonium indole-2-carboxylate
ammonium 3-quinolinecarboxylate
ammonium 2-dibenzofurylacetate ammonium cyclopropylmalonate
ammonium terephthalate
ammonium phenyladipate
ammonium diphenate
ammonium vinylacetate
ammonium fumarate
ammonium 7-octenoate
ammonium 1-cyclopentenylcarboxylate
ammonium cinnamate
ammonium vinylbenzoate
ammonium 2-furylacrylate
ammonium propiolate
ammonium stearolate
ammonium α-chlorocaproate
ammonium p-bromobenzoate
ammonium α-thienylglyoxylate
ammonium benzoylformate
ammonium fluorenone-2-carboxylate Additional illustrative acids which are reacted with ammonia used to prepare the ammonium catalysts in the process of this invention are known to those skilled in the art and are set forth at pages 439–464 of Synthetic Organic Chemistry by Wagner and Zook (Wiley and Sons, 1953).

The types of phosphorus halides utilized and prepared in accordance with this invention may be either starting materials or intermediates or end products of the process. For instance, a phosphoryl halide may be a starting material used to prepare a dihalidate phosphorus monoester such as a R' phosphorodihalidate. The R' phosphorodihalidate may be an intermediate in the preparation of, for example, a monohalidate phosphorus diester such as a di-R' phosphorohalidate. At the same time, however, the R' phosphorodihalidate and di-R' phosphorohalidate may be considered mono- and di-ester end products of the process of this invention. The phosphorus halides utilized are well known to those skilled in the art. Many are commercially available and all are easily prepared in accordance with the process of this invention. The compounds are encompassed by the scope of Formula I and include, by way of illustration, compounds such as:

Phosphoryl halides:

Thiophosphoryl halides:

R' phosphorodihalidates:

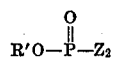

O-R' phosphorodihalidothioates:

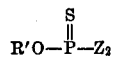

S-R' phosphorodihalidothioates:

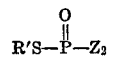

S-R' phosphorodihalidodithioates:

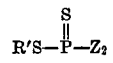

Di-R' phosphorohalidates:

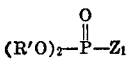

O,O-di-R' phosphorohalidothioates:

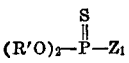

O,S-di-R' phosphorohalidothioates:

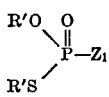

S,S-di-R' phosphorohalidodithioates:

$$(R'S)_2-\overset{O}{\underset{\|}{P}}-Z_1$$

O,S-di-R' phosphorohalidodithioates:

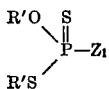

S,S-di-R' phosphorohalidotrithioates:

$$(R'S)_2-\overset{S}{\underset{\|}{P}}-Z_1$$

R-phosphonic dihalides:

$$R-\overset{O}{\underset{\|}{P}}-Z_2$$

R-phosphonothioic dihalides:

$$R-\overset{S}{\underset{\|}{P}}-Z_2$$

Di-R-phosphinic halides:

$$R_2-\overset{O}{\underset{\|}{P}}-Z_1$$

Di-R-phosphinothioic halides:

$$R_2-\overset{S}{\underset{\|}{P}}-Z_1$$

R'R-phosphonohalidates:

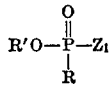

R'R-phosphonohalidothioates:

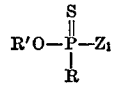

S-R' R-phosphonohalidothioates:

S-R' R-phosphonohalidodithioates:

In the above formulas, R, R' and Z are defined as in Formula I.

As described in Formula I, R represents alkyl, e.g., methyl, ethyl, propyl, butyl, amyl, hexyl, heptyl, octyl, decyl, undecyl, dodecyl, pentadecyl, hexadecyl, octadecyl, nonadecyl and eicosyl, whether straight or branched chain in configuration; cycloalkyl, e.g., cyclopropyl, cyclobutyl, cyclopentyl, ethylcyclopropyl, cyclohexyl, methylcyclopentyl, methylcyclohexyl, decahydronaphthyl, bicyclohexyl (cyclohexylcyclohexyl), tetradecahydropenanthryl, tricyclohexylmethyl; alkenyl, e.g., ethenyl, propenyl, butenyl, isobutenyl, pentenyl, methylbutenyl, trimethylethenyl, hexenyl, heptenyl, octenyl, nonenyl, decenyl, dodecenyl, tridecenyl, hexadecenyl, octadecenyl, eicosenyl; cycloalkenyl, e.g., cyclopropentyl, cyclopentenyl, cyclohexenyl, cyclohexylcyclohexenyl; alkynyl, e.g., ethynyl, propynyl, butynyl, pentynyl, hexynyl, heptynyl, octynyl, nonynyl, decynyl, tridecynyl, octadecynyl, eicosynyl; cycloalkynyl, e.g., 1-cycloden-4-yl; heterocyclic radicals containing oxygen or sulfur in the heterocyclic ring, e.g., thiophenyl, furanyl, tetrahydrofuranyl, pyranyl, sulfolanyl; aryl, e.g., phenyl, naphthyl, biphenyl, phenanthryl, anthracyl, terphenyl or quaterphenyl; and R' represents alkyl or aryl, as described above with reference to R.

R and R' may be unsubstituted, as described above, or substituted. It is to be understood that the catalysts of this invention will catalyze the preparation of halogenated organophosphorus esters in accordance with this invention regardless of the type or extent of substitution of the radicals defined as included within R and R' above. Thus the radicals represented by R and R' may be substituted with any moiety except a carboxyl group or a hydroxyl group which may interfere with the reaction.

The following radicals are illustrative of the substituents which may occur on the groups represented by R and R' of the phosphorus halides and on the organic moieties of ammonium salts formed from organic acids: alkyl, cycloalkyl, alkenyl, cycloalkenyl, alkynyl, cycloalkynyl and aryl as described above. Also, halo, e.g., chloro, bromo, fluoro, iodo; alkoxy, e.g., methoxy, propoxy, butoxy, hexoxy, decoxy; cycloalkoxy, e.g., cyclohexoxy, cyclobutoxy; alkenoxy, e.g., propenoxy, cycloalkenoxy, e.g., cyclopentenoxy; aryloxy, e.g., phenoxy, naphthoxy; cyano; nitro; isonitro; aldehyde; ketone, alkoxycarbonyl, e.g., methoxycarbonyl; aryloxycarbonyl, e.g., phenoxycarbonyl; alkylcarbonyloxy, e.g., acetyl; alkoxycarbonyloxy, e.g., acetoxy; arylcarbonyloxy, e.g., benzoyl; alkylthio, e.g., ethylthio; arylthio, e.g., phenylthio, naphthylthio; trihaloalkyl, e.g., trifluoromethyl; alkylsulfinyl, e.g., butylsulfinyl; arylsulfinyl, e.g., phenylsulfinyl: alkylsulfonyl, e.g., propylsulfonyl; arylsulfonyl, e.g., phenylsulfonyl.

Specific phosphorus halides which are encompassed within the scope of this invention, and which may be starting materials and/or desired products, include phosphoryl chloride, phosphoryl bromide, phosphoryl dibromide chloride, thiophosphoryl chloride and bromide, phenyl phosphorodichloridate, p-chlorophenyl phosphorodibromidate, p-nitrophenyl phosphorodichloridate, p-nitrophenyl phosphorodichloridothioate, cresyl phosphorodichloridate, o-methoxyphenyl phosphorodichloridate, nonylphenyl phosphorodichloridate, cumylphenyl phosphorodichloridate, o-biphenyl phosphorodichloridate, naphthyl phosphorodichloridate, isopropylphenyl phosphorodichloridate, tert-butylphenyl phosphorodichloridate, isodecyl phosphorodichloridate, S-phenyl phosphorodichloridothioate, S-p-nitrophenyl phosphorodichloridothioate, S-phenyl phosphorodichloridodithioate, dihenyl phosphorochloridate, dicresyl phosphorochloridate, O,O-diphenyl phosphorochloridothioate, S,S-diphenyl phosphorobromidodithioate, S,S-diphenyl phosphorochloridotrithioate, phenylphosphonic dichloride, p-chlorophenylphosphonic dibromide, methylphosphonic dichloride, chloromethylphosphonic dichloride, phenylphosphonothioic dichloride, cresylphosphonothioic dibromide, methylphosphonothioic dichloride, chloromethylphosphonothioic dichloride, butyl phosphorodichloridate, hexyl phosphorodichloridate, octyl phosphorodichloridate, decyl phosphorodichloridate, phenyl phenylphosphonochloridate, p-nitrophenyl phenylphosphonochloridate, cresyl phenylphosphonochloridate, O-phenyl phenylphosphonochloridothioate, S-phenyl phenylphosphonobromidothioate, S-phenyl phenylphosphonochloridodithioate.

The alcohols and thioalcohols embraced by the scope of Formula II include those compounds wherein R" represents aryl groups as defined with respect to R and R' of the phosphorus halides. Thus, R" represents phenyl, alkylphenyl, halophenyl, arylphenyl, cycloalkylphenyl, naphthyl, biphenyl, phenanthryl, anthracyl, terphenyl, quaterphenyl, whether substituted or nonsubstituted.

Specific alcohols of the formula R"XH which will illustrate the types of compounds utilized include phenol, o, m, p-cresol, o-ethylphenyl, o, m, p-isopropylphenol, p-tert-butylphenol, p-tert-amylphenol, nonylphenol, 2,4-xylenol, 2,6-xylenol, 2,5-xylenol, 2,3-xylenol, o, m, p-chlorophenol, p-bromophenol, p-iodophenol, 2,4-dichlorophenol, 2,4,5- trichlorophenol, pentachlorophenol, o-phenylphenol, p-cumylphenol, o - cyclohexylphenol, alpha-naphthol, beta-naphthol, o-methoxyphenol, p-ethoxyphenol, o-phenoxyphenol, p-nitrophenol, p-trifluoromethylphenol, 2-allylphenol, 2-benzylphenol, vanillin, 4-chloro-3,5-dimethylphenol, 4-chloro-1-naphthol, 2-chloro-4-nitrophenol, 4-cyanophenol, 2,4 - di - tert-butylphenol, 2,4-dimethoxyphenol, methylsalicylate, 2-fluorophenol, p-hydroxyacetophenone, 4-hydroxybenzaldehyde, thiophenol, p-chlorothiophenol, p-tert-butylthiophenol, thiocresol, thioxylenol, phenylthiophenol, thionaphthol, allylthiophenol.

The compounds of Formulas I and II, described above, are generally known in the art and their methods of preparation are available in standard texts and reference sources.

A preferred class of the compounds of Formula I are those compounds of the formula $$Y_m-\underset{\underset{O}{\|}}{P}-Z_n$$

wherein Y=R or R'O wherein R'=aryl or substituted aryl and R, Z, m and n are defined in Formula I. Representative of this preferred class of compounds are phosphoryl chloride, phosphoryl bromide, phenyl phosphorodichloridate, p-chlorophenyl phosphorodibromidate, p-nitrophenyl phosphorodichloridate, cresyl phosphorodichloridate, o - methoxyphenylphosphorodichloridate, nonylphenyl phosphorodichloridate, cumylphenyl phosphorodichloridate, o-biphenyl phosphorodichloridate, naphthyl phosphorodichloridate, isopropylphenyl phosphorodichloridate, tert-butylphenyl phosphorodichloridate, diphenyl phosphorochloridate, dicresyl phosphorochloridate, phenylphosphonic dichloride, p-chlorophenylphosphonic dichloride, methylphosphonic dibromide, chloromethylphosphonic dichloride, phenyl phenylphosphonocloridate, p-nitrophenyl phenylphosphonochloridate, cresyl phenylphosphonochloridate.

A preferred class of the compounds of Formula II are those compounds of the formula R"OH. Representative of this preferred class of compounds are phenol, o, m, p-cresol, o-ethylphenol, o, m, p-isopropylphenol, p-tert-butylphenol, p-tert-amylphenol, nonylphenol, xylenol, o, m, p-chlorophenol, p-bromophenol, p-iodophenol, dichlorophenol, trichlorophenol, pentachlorophenol, p-cumylphenol, p-nitrophenol, o-cyclohexylphenol, naphthol, methoxyphenol, ethoxyphenol, phenoxyphenol, p-nitrophenol, trifluoromethylphenol, allylphenol, benzylphenol, vanillin, 4 - chloro - 3,5-dimethylphenol, 4-chloro-1-naphthol, 2-chloro-4-nitrophenol, cyanophenol, di-tert-butylphenol, dimethoxyphenol, methylsalicylate, fluorophenol. Especially preferred of this group are phenol, cresol, cumylphenol, nonylphenol, chlorophenol, tert-butylphenol, xylenol, phenylphenol, isopropylphenol and mixtures thereof.

A specialized class of alcohols which are utilized in accordance with this invention are alcohols of the formula (III)　　　HO—R'''—OH

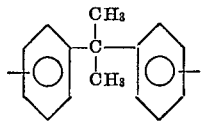

or phenyl, e.g.

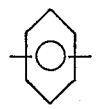

Representative of this special class of alcohols are isopropylidenediphenol, hydroquinone, catechol and resorcinol.

In accordance with the novel process of this invention, the reaction between the phosphorus halides and alcohols to prepare organophosphorus esters proceeds in two stages. Use of the aforedescribed ammonium salts, in conjunction with specific temperatures, produces the desired results of this invention. Thus, in the presence of the ammonium catalysts of this invention, the first chlorine of, for example, phosphoryl chloride is replaced at a temperature of from about 85 to about 135° C., preferably 105° C. The second chlorine, i.e., disubstitution, is replaced at a temperature of from about 130 to about 165° C., preferably 150° C. Of course, the specific temperatures for mono- and di-substitution will vary with the particular reactants being used, but the comparative differences in the temperatures for the stages of substitution will remain approximately the same.

Accordingly, the combination of specific temperatures for mono- and di-substitution of the desired phosphorus halides, together with the catalysts of this invention, enable those skilled in the art to prepare mono- or di-organophosphorus esters in selected proportions. Di-organophosphorus esters may be prepared in two stages, with a different alcohol being added at each stage. Similarly, mixtures of esters may be prepared in one reactor. For example, by adding a naphthyl group at the first stage and a chlorophenyl group at the second stage, one may use the same phosphorus halide but merely introduce different appropriate alcohols at the temperature stages set forth to obtain naphthyl chlorophenyl phosphorochloridate and naphthyl phosphorodichloridate. The different compounds may then be recovered separately by methods known in the art. Further, selected proportions of various compounds may be prepared in the same reactor. Thus, if one desires a mixture of phenyl phosphorodichloridate and naphthyl phenyl phosphorochloridate in proportions of 2:1, such selective proportions of the desired products can be made in accordance with the present invention by adding the intended proportion of each appropriate alcohol in the separate stages.

The following examples will serve to illustrate specific embodiments of the concept of this invention but are not to be regarded as restrictive of the scope thereof since it has been found that the process of this invention promotes the reaction between virtually any phosphorus halide and any alcohol as defined herein.

Example 1

To a mixture of 153.4 g. phosphoryl chloride and 2.6 g. ammonium sulfate there is added 94 g. phenol over a one-hour period at a temperature of 105° C. The temperature is raised to 115° C. and held for two hours, cooled and stripped of residual hydrogen chloride and other low boilers. Distillation affords 64.7 percent phenyl phosphorodichloridate and 22.5 percent diphenyl phosphorochloridate.

Example 2

To a mixture of 225 g. phosphoryl chloride and 1 g. ammonium chloride there is added 94 g. phenol over a two-hour period at a temperature of 100–106° C. The temperature is held at 105° C. for one and one-half hours, allowed to cool to room temperature and stripped. Distillation affords 67.8 percent phenyl phosphorodichloridate and 12.5 percent diphenyl phosphorochloridate.

Example 3

To a mixture of 225 g. phosphoryl chloride and 2 g. ammonium nitrate there is added 94 g. phenol over a two-hour period at a temperature of 105–107° C. The temperature is held at 107–110° C. for two hours, cooled and stripped. Distillation affords 74.5 percent phenyl phosphorodichloridate and 21.1 percent diphenyl phosphorochloridate.

Example 4

To a mixture of 225 g. phosphoryl chloride and 2 g. ammonium acetate there is added 94 g. phenol over a two-hour period at a temperature of 105° C. The temperature is then raised to 110° C. and held for two hours, stripped and allowed to cool to room temperature. Distillation of the reaction mixture affords 74.2 percent phenyl phosphorodichloridate and 16.7 percent diphenyl phosphorochloridate.

Example 5

To a mixture of 25 g. phosphoryl chloride and 2.4 g. ammonium benzenesulfonate there is added 150 g. p-tert-butylphenol over a period of two hours at a temperature of 100° C. The temperature is then raised to 110° C. and held for two hours, stripped and cooled. Distillation of the reaction mixture affords 94.3 percent p-tert-butylphenyl phosphorodichloridate and 2.5 percent di-p-butylphenyl phosphorochloridate.

Example 6

To a reaction vessel there is added 113 g. phosphoryl chloride and 0.8 g. ammonium carbonate. Over a period of one hour, a total of 64 g. o-chlorophenol is added and the pot temperature is raised from 100 to 110° C. and held at 110° C. for one hour and then allowed to gradually cool to room temperature. The reaction mixture is stripped and there is obtained 108 g. product which affords, on distillation, 93.7 percent o-chlorophenyl phosphorodichloridate and 7.3 percent di-o-chlorophenyl phosphorochloridate.

Example 7

To a mixture of 225 g. phosphoryl chloride and 0.7 g. ammonium chloride there is added 94 g. phenol over a one-hour period at 95° C. The temperature is then raised to 105° C. and held for two hours. The reaction mixture is distilled affording 97 percent phenyl phosphorodichloridate and 3 percent diphenyl phosphorochloridate.

Example 8

To a reaction vessel there is added 225 g. phosphoryl chloride, 1.0 g. ammonium chloride and 55 g. m-hydroxyphenol and the pot temperature is gradually raised to 115° C. over three hours. Vacuum is applied and distillation of the reaction mixture affords 92.2 percent m-phenylene bis(diphosphorotetrachloridate).

Example 9

To a mixture of 113 g. phosphoryl chloride and 0.3 g. ammonium acetate there is added 72 g. alpha-naphthol over a one and one-half hour period at a temperature of 100° C. The temperature is held at 105–110° C. for one and one-half hours and stripped. Distillation affords 94.6 percent naphthyl phosphorodichloridate and 3.4 percent dinaphthyl phosphorochloridate.

Example 10

A mixture of 225 g. phosphoryl chloride, 2.5 g. ammonium phosphate and 114 g. 4,4'-isopropylidenediphenol is heated at 100–105° C. for three hours. The reaction mixture is allowed to cool to room temperature and stripped. Distillation affords 4,4'-isopropylidenediphenyl diphosphorotetrachloridate.

Example 11

In a reaction pot there is mixed 25 g. phosphoryl chloride and 1.5 g. ammonium cyanate. Addition of 94 g. phenol is started at a temperature of 95° C. and the total addition is carried out over a period of three hours, during which time the temperature is raised to 105° C. The reaction is then held at 105–110° C. for an additional one and one-half hours, stripped and cooled. Distillation affords 91.7 percent phenyl phosphorodichloridate and 5.2 percent diphenyl phosphorochloridate.

Example 12

To a mixture of 25 g. phosphoryl chloride and 94 g. phenol there is added 18.0 g. ammonium butyrate over a period of one hour at 105° C. The temperature is then raised to 105–110° C. and held for two hours and the reaction mixture is stripped. Distillation affords 76.7 percent phenyl phosphorodichloridate and 4.2 percent diphenyl phosphorochloridate.

Example 13

(1) To 315 g. phosphoryl chloride and 4.0 g. ammonium caproate there is added 188 g. phenol over a two-hour period at a temperature of 105° C. The temperature is held to 110° C. for two hours and allowed to cool. The reaction mixture is principally phenyl phosphorodichloridate.

(2) To the reaction mixture of (1), there is added 188 g. phenol and the temperature is raised to 150° C. for two hours. The reaction mixture is allowed to cool and stripped of phenyl phosphorodichloridate. Distillation of the residue affords principally diphenyl phosphorochloridate.

The following table illustrates further examples of the reaction of a phosphorus halide and an alcohol or trioalcohol in the presence of an ammonium catalyst.

TABLE

| Example | Phosphorus halide | Alcohol | Catalyst |
|---|---|---|---|
| 14 | Phosphoryl bromide | o, m, p-Cresol | Ammonium stearate. |
| 15 | Thiophosphoryl chloride | o-Ethylphenyl | Ammonium acrylate. |
| 16 | Phenyl phosphorodichloridate | Xylenol | Ammonium lactate. |
| 17 | o-Methoxyphenyl phosphorodichloridate | Nonylphenol | Ammonium benzoate. |
| 18 | Phenylphosphonic dichloride | Thiophenol | Ammonium phthalate. |
| 19 | Chloromethylphosphonic dibromide | o-Methoxyphenol | Ammonium naphthoate. |
| 20 | Phenylphosphonothioic dichloride | Phenoxyphenol | Ammonium 2-furancarboxylate. |
| 21 | Phenylphosphonic dichloride | 4,4'-isopropylidene diphenol | Ammonium terephthalate. |
| 22 | O-phenyl phosphorochloridothioate | Hydroquinone | Ammonium oxalate. |
| 23 | S-phenyl phosphorobromidothioate | Resorcinol | Ammonium chloride. |
| 24 | p-Chlorophenyl phosphorodibromidate | p-Cumylphenol | Ammonium acetate. |
| 25 | Cresyl phosphorodichloridate | p-tert-Amylphenol | Ammonium vinylacetate. |
| 26 | Nonylphenyl phosphorodichloridate | Pentachlorophenol | Ammonium sulfite. |
| 37 | Cumylphenyl phosphorodibromidate | Phenoxyphenol | Ammonium bromide. |
| 38 | Naphthyl phosphorodichloridate | p-Bromophenol | Ammonium 1-cyclopentenylcarboxylate. |
| 29 | Phenylphosphonic dichloride | Nitrophenol | Ammonium borate. |
| 20 | Cumyl phosphorodichloridate | Nonylphenol | Ammonium formate. |
| 21 | Phenyl phosphorodichloridate | Fluorophenol | Ammonium bicarbonate. |

Example 32

(1) To a mixture of 225 g. phosphoryl chloride and 1.5 g. of ammonium chloride there is added 109 g. cresol over a period of two hours at a temperature of 105° C. The temperature is held at 105–110° C. for two hours to afford cresyl phosphorodichloridate.

(2) The temperature of the reaction mixture obtained in (1) is raised to 135° C. and 109 g. cresol is fed into the reactor over a two hour period. The temperature is held at 150° C. for an additional one and one-half hours to afford dicresyl phosphorochloridate.

Example 33

(1) To a mixture of 225 g. phosphoryl chloride and 1.7 g. of ammonium acetate there is added 94 g. phenol over a two-hour period at a temperature of 105–110° C. The temperature is held for two hours at 110–115° C. to afford phenyl phosphorodichloridate.

(2) The temperature of the reaction mixture of (1) is raised to 135° C. and 109 g. cresol is fed into the reactor during two hours. The temperature is held at 150° C. for an additional two hours to afford cresyl phenyl phosphorochloridate.

Example 34

(1) To a mixture of 920 g. phosphoryl chloride and 4.5 g. ammonium chloride there is added a mixture of 614 g. cumylphenol and 794 g. nonylphenol during two hours at a temperature of 105–110° C. to afford a mixture of cumylphenyl phosphorodichloridate and nonylphenyl phosphorodichloridate.

(2) The temperature of the reaction mixture obtained in (1) is raised to 135° C. and 565 g. phenol are added over a two-hour period. The temperature is held at 150° C. for an additional one and one-half hours to afford a mixture of cumylphenyl phenyl phosphorochloridate and nonylphenyl phenyl phosphorochloridate.

Example 35

(1) To a mixture of 225 g. phosphoryl chloride and 1.8 g. ammonium acetate there is added 109 g. cresol over a period of two hours at a temperature of 105° C. The temperature is held at 105–110° C. for two hours to afford cresyl phosphorodichloridate.

(2) The temperature of the reaction mixture obtained in (1) is raised to 135° C. and 94 g. phenol is added during two hours at a temperature of 150° C. and held for an additional two hours to afford cresyl phenyl phosphorochloridate.

The embodiments of the invention in which an exclusive property or privilege is claimed are defined as follows:

1. The process of preparing organophosphorus esters which comprises reacting a phosphorus halide of the formula

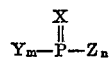

wherein
X represents oxygen or sulfur;
Y represents R or R'X;
R represents alkyl, alkenyl, alkynyl, cycloalkyl, cycloalkenyl, cycloalkynyl, heterocyclyl or aryl;
R' represents alkyl or aryl;
$m$ represents 1 when $n=2$ and 0 when $n=3$;
$n$ represents 2 or 3; and
Z represents chloro or bromo with a compound of the formula

R"XH wherein
R" represents aryl; and
X represents oxygen or sulfur
at a temperature of up to about 165° C. in the presence of a catalytic amount of an ammonium salt containing a nitrogen atom capable of forming a complex with the phosphorus moiety of said phosphorus halide.

2. The process of claim 1 wherein R" is selected from the group consisting of phenyl, cresyl, cumylphenyl, nonylphenyl, xylyl, tert-butylphenyl, phenylyl, isopropylphenyl, chlorophenyl and mixtures thereof.

3. A process for preparing an organophosphorusdihalidate which comprises reacting a phosphorus halide according to claim 1 with an approximately equimolar amount of a compound of the formula R"XH according to claim 1 at a temperature of about 135° C. in the presence of a catalytic amount of an ammonium salt containing a nitrogen atom capable of forming a complex with the phosphorus moiety of said phosphorus halide.

4. The process of claim 3 wherein R" is selected from phenyl, cresyl, cumylphenyl, nonylphenyl, xylyl, tert-butylphenyl, phenylyl, isopropylphenyl, chlorophenyl and mixtures thereof.

5. The process of claim 3 wherein said organophosphorusdihalidate is selected from phenyl phosphorodichloridate, phenylyl phosphorodichloridate, cresyl phosphorodichloridate cumylphenyl phosphorodichloridate, tert-butylphenyl phosprorodichloridate, nonylphenyl phosphorodichloridate, xylyl phosphorodichloridate, isopropylphenyl phosphorodichloridate, chlorophenyl phosphorodichloridate and mixtures thereof.

6. A process for preparing a diorganophosphorushalidate which comprises reacting an organophosphorusdihalidate with an approximately equimolar amount of a compound of the formula R"XH according to claim 1 at a temperature of about 165° C. in the presence of a catalytic amount of an ammonium salt containing a nitrogen atom capable of forming a complex with the phosphorus moiety of said organophosphorusdihalidate.

7. The process of claim 6 wherein said diorganophosphorushalidate is selected from nonylphenyl phenyl phosphorochloridate and cumylphenyl phenyl phosphorochloridate and mixtures thereof.

8. A process for preparing organophosphorus esters which comprises reacting, in the presence of a catalytic amount of an ammonium salt containing a nitrogen atom capable of complexing with a phosphorus moiety, (1) a phosphorus halide of claim 1 with an approximately equimolar amount of a first compound of formula R"XH of claim 1 at a temperature of about 85–135° C. to form an organophosphorusdihalidate, (2) adding an approximately equimolar amount of a second compound of formula R"XH to the reaction product of (1) at a temperature of about 130–165° C. to form a diorganophosphorushalidate.

9. The process of claim 8 wherein said compound of formula R"XH is selected from the group consisting of phenol, cresol, cumylphenol, nonylphenol, xylenol, terbutylphenol, phenylphenol, isopropylphenol, chlorophenol and mixtures thereof.

10 The process of preparing organophosphorus esters according to claim 1 which comprises reacting a phosphorus halide of the formula

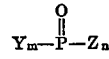

wherein
Y represents R or R'O;
R represents alkyl, alkenyl, alkynyl, cycloalkyl, cycloalkenyl, cycloalkynyl, heterocyclyl or aryl;
R' represents aryl;
$m$ represents 1 when $n=2$ and 0 when $n=3$;
$n$ represents 2 or 3; and
Z represents chloro or bromo
with an approximately $n$ molar amount of a compound of the formula

R"XH wherein
R" represents aryl; and
X represents oxygen or sulfur
at a temperature of up to about 165° C. in the presence of a catalytic amount of ammonium salt capable of complexing with a phosphorus moiety.

11. The process of preparing organophosphorus esters according to claim 1 which comprises reacting a phosphorus halide of the formula

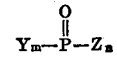

Y represents R or R'O;
R represents alkyl, alkenyl, alkynyl, cycloalkyl, cycloalkenyl, cycloalkynyl, heterocyclyl or aryl;
R' represents aryl;
$m$ represents 1 when $n=2$ and 0 when $n=3$;
$n$ represents 2 or 3; and
Z represents chloro or bromo
with an approximately $n$ molar amount of a compound of the formula

R"OH wherein R" represents aryl
at a temperature of up to 165° C. in the presence of a catalytic amount of an ammonium salt capable of complexing with a phosphorus moiety.

12. The process of claim 11 wherein R" is selected from phenyl, cresyl, cumylphenyl, nonylphenyl, xylyl, tert-butylphenyl, phenylyl, isopropylphenyl, chlorophenyl and mixtures thereof.

13. The process of claim 11 wherein said ammonium salt is selected from ammonium sulfate, ammonium chloride, ammonium nitrate, ammonium acetate, ammonium benzenesulfonate, ammonium phosphate, ammonium oxalate and ammonium carbonate.

14. The process of preparing organophosphorus esters according to claim 1 which comprises reacting a phosphorus halide of the formula $$Y_m-\overset{\overset{O}{\|}}{P}-Z_n$$

wherein
Y represents R or R'O;
R represents alkyl, alkenyl, alkynyl, cycloalkyl, cycloalkenyl, cycloalkynyl, heterocyclyl or aryl;
R' represents aryl;
$m$ represents 1 when $n=2$ and 0 when $n=3$;
$n$ represents 2 or 3; and
Z represents chloro or bromo
with an approximately $n$ molar amount of a compound of the formula

HO—R'''—OH wherein R''' represents isopropylidenediphenylene or phenylene
at a temperature of up to about 165° C. in the presence of a catalytic amount of an ammonium salt capable of complexing with a phosphorus moiety.

15. The process of preparing an organophosphorus ester according to claim 11 which comprises reacting phosphoryl chloride with an approximately dimolar amount of phenol at a temperature of up to about 165° C. in the presence of an ammonium salt catalyst capable of complexing with a phosphorus moiety.

16. The process of claim 11 wherein said organophosphorus ester is selected from diphenyl phosphorochloridate, dicresyl phosphorodichloridate, cumylphenyl phenyl phosphorochloridate, cresyl phenyl phosphorochloridate, nonylphenyl phenyl phosphorochloridate and mixtures thereof.

17. A process for preparing organophosphorus esters which comprises reacting (1) a phosphorus halide of claim 11 with an approximately equimolar amount of a first compound of formula R"OH of claim 11 at a temperature of 85–135° C., and (2) adding an approximately equimolar amount of a second compound of formula R"OH of claim 11 to the reaction product of (1) at a temperature of 130–165° C. in the presence of 0.001 to 2.0 mole percent, based on the phosphorus halide, of an ammonium salt containing a nitrogen atom capable of forming a complex with a phosphorus moiety.

References Cited
UNITED STATES PATENTS
3,549,730  12/1970  Abadir et al. _____ 260—975

ANTON H. SUTTO, Primary Examiner

U.S. Cl. X.R.

252—46.6, 49.8, 78; 260—30.6, 347.3, 345.7, 930, 975

PO-1050
(5/69)

UNITED STATES PATENT OFFICE
CERTIFICATE OF CORRECTION

Patent No. 3,773,866      Dated November 20, 1973

Inventor(s) Joseph W. Baker and Ignatius Schumacher

It is certified that error appears in the above-identified patent and that said Letters Patent are hereby corrected as shown below:

Column 4, line 27, "amonium" should read -- ammonium --.

Column 9, line 57 immediately following the formula HO-R'''-OH insert -- wherein R''' represents isopropylidenediphenylene, e.g., --.

Column 11, line 5, "25" should read -- 225 --.

Column 11, line 12, delete "butylphenyl phosphorochloridate" and substitute therefor -- tert-butylphenyl phosphorochloridate --.

Column 12, line 1, "25" should read -- 225 --.

Column 12, line 12, "25" should read -- 225 --.

In the table bridging Columns 11 and 12, under the heading "Example" the last five example numbers should be as follows:

"37" should be -- 27 --
"38" should be -- 28 --
"29" is correct
"20" should be -- 30 --
"21" should be -- 31 --

In the table bridging Columns 11 and 12, under the heading "Alcohol" the entry "4,4'-iospropylidene diphenol" should read -- 4,4'-isopropylidene diphenol --.

In the table bridging Columns 11 and 12, under the heading "Catalyst" the entry "Ammonium 2-flurancarboxylate" should read -- Ammonium 2-furancarboxylate --.

Column 14, line 33 (Claim 9), "ter-" should read -- tert- --.

UNITED STATES PATENT OFFICE
CERTIFICATE OF CORRECTION

Patent No. 3,773,866     Dated November 20, 1973

Inventor(s) Joseph W. Baker and Ignatius Schumacher

It is certified that error appears in the above-identified patent and that said Letters Patent are hereby corrected as shown below:

Page 2

Column 14, line 65 (Claim 11), immediately following the formula, insert -- wherein --.

Column 15, line 33, "R" " should read -- R"' --.

Signed and sealed this 14th day of May 1974.

(SEAL)
Attest:

EDWARD M. FLETCHER, JR.
Attesting Officer

C. MARSHALL DANN
Commissioner of Patents